(12) United States Patent
Liu et al.

(10) Patent No.: US 11,814,995 B2
(45) Date of Patent: Nov. 14, 2023

(54) ENGINE AFTERTREATMENT RECYCLING APPARATUS, AND SYSTEM AND METHOD USING SAME

(71) Applicant: Cummins Inc., Columbus, IN (US)

(72) Inventors: Kunlun Liu, Bargersville, IN (US); Xiaobo Song, Columbus, IN (US); Xing Jin, Columbus, IN (US); Kristopher R. Bare, Columbus, IN (US); Sriram S. Popuri, Greenwood, IN (US); Scott Robert Bardakjy, Columbus, IN (US); Agneya Turlapati, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/663,562

(22) Filed: May 16, 2022

(65) Prior Publication Data
US 2022/0290594 A1 Sep. 15, 2022

Related U.S. Application Data

(63) Continuation of application No. PCT/US2019/063312, filed on Nov. 26, 2019.

(51) Int. Cl.
*F01N 3/20* (2006.01)
*B01D 53/94* (2006.01)
(Continued)

(52) U.S. Cl.
CPC ....... *F01N 3/2006* (2013.01); *B01D 53/9418* (2013.01); *F01N 3/2066* (2013.01);
(Continued)

(58) Field of Classification Search
CPC combination set(s) only.
See application file for complete search history.

(56) References Cited

U.S. PATENT DOCUMENTS

| 5,388,405 A * | 2/1995 | Fujishita ............... F01N 3/0814 60/284 |
| 5,618,499 A | 4/1997 | Lewis et al. |

(Continued)

FOREIGN PATENT DOCUMENTS

| DE | 102016014254 A1 | 6/2017 |
| DE | 102018106588 A1 | 9/2019 |

(Continued)

OTHER PUBLICATIONS

International Search Report and Written Opinion, PCT Appln. Serial No. PCT/US19/63312, dated Feb. 6, 2020, 9 pgs.
(Continued)

*Primary Examiner* — Binh Q Tran
(74) *Attorney, Agent, or Firm* — Taft Stettinius & Hollister LLP

(57) ABSTRACT

A recycling loop configuration of an exhaust gas aftertreatment system decreases a level of system-out $NO_x$ emissions of an engine. An apparatus including the configuration has an exhaust gas recycling system having a closed gas recycling loop system configured to heat gas circulating within the loop, and a blower for circulating gas within the loop. A method for operating the engine includes preheating at least one aftertreatment component of an exhaust gas aftertreatment system of the engine by exposing the component to heated gas circulating in a closed gas recycling loop.

18 Claims, 6 Drawing Sheets

(51) Int. Cl.
*F02D 41/06* (2006.01)
*F01N 9/00* (2006.01)

(52) U.S. Cl.
CPC ............ *F02D 41/064* (2013.01); *F01N 3/206* (2013.01); *F01N 9/00* (2013.01); *F01N 2240/16* (2013.01); *F01N 2260/06* (2013.01); *F01N 2270/04* (2013.01); *F01N 2270/08* (2013.01); *F01N 2270/10* (2013.01); *F01N 2610/1433* (2013.01)

(56) References Cited

U.S. PATENT DOCUMENTS

| | | | |
|---|---|---|---|
| 6,435,166 B1* | 8/2002 | Sato | F02M 26/05 123/568.21 |
| 8,591,844 B1 | 11/2013 | Johnson et al. | |
| 10,830,116 B2 | 11/2020 | Laube et al. | |
| 11,428,132 B2 | 8/2022 | Hall et al. | |
| 2003/0077499 A1 | 4/2003 | Siepierski et al. | |
| 2004/0182359 A1* | 9/2004 | Stewart | F02D 41/3035 123/295 |
| 2007/0193270 A1* | 8/2007 | Roozenboom | F02M 26/08 60/605.1 |
| 2009/0000275 A1* | 1/2009 | Zielke | F02B 37/007 60/299 |
| 2010/0205941 A1* | 8/2010 | Okada | F02M 26/28 60/299 |
| 2013/0047607 A1 | 2/2013 | Petrovic et al. | |
| 2014/0020361 A1* | 1/2014 | Warey | F02M 26/35 60/273 |
| 2014/0047817 A1* | 2/2014 | Vigild | F02M 26/15 60/273 |
| 2014/0360461 A1* | 12/2014 | Ulrey | F02M 26/43 123/299 |
| 2015/0075451 A1* | 3/2015 | Inuzuka | F02B 43/12 123/3 |
| 2017/0241364 A1* | 8/2017 | Sczomak | F02D 41/1463 |
| 2018/0156143 A1* | 6/2018 | Hussain | F02D 41/0055 |
| 2018/0340480 A1 | 11/2018 | Mehta | |
| 2018/0347514 A1* | 12/2018 | Hebert | F02M 26/25 |
| 2019/0006686 A1 | 1/2019 | Carralero et al. | |

FOREIGN PATENT DOCUMENTS

| | | |
|---|---|---|
| GB | 2254014 A | 9/1992 |
| KR | 20170118324 A | 10/2017 |
| WO | 9825011 A1 | 6/1998 |
| WO | 2017204589 A1 | 11/2017 |
| WO | 2018094420 A1 | 5/2018 |
| WO | 2019033134 A1 | 2/2019 |
| WO | 2020/126314 A1 | 6/2020 |

OTHER PUBLICATIONS

European Extended Search Report, EP Appln. No. 19954242.4, dated Jun. 30, 2023, 7 pgs.

* cited by examiner

ENGINE AFTERTREATMENT RECYCLING APPARATUS, AND SYSTEM AND METHOD USING SAME

CROSS-REFERENCE TO RELATED APPLICATION

The present application is a continuation of International Application No. PCT/US19/63312 filed Nov. 26, 2019, which is incorporated herein by reference.

TECHNICAL FIELD

The present invention generally relates to configurations for exhaust gas aftertreatment systems in internal combustion engines. More particularly, embodiments of the present invention relate to a recycling loop configuration of an exhaust gas aftertreatment system used to decrease a level of system-out $NO_x$ emissions.

BACKGROUND

Exhaust gas aftertreatment systems may include selective catalytic reduction systems (SCR), which typically are configured to provide one or more catalyst elements that, with the aid of a reductant, convert nitrogen oxides ($NO_x$) in exhaust gases into nitrogen ($N_2$) and water. The efficiency of chemical reactions by an SCR catalyst may depend on a variety of different factors, including, for example, the temperature of the SCR catalyst and/or properties of the exhaust gas, such as an inlet temperature of the exhaust gas steam that enters into the SCR. If a temperature of the SCR catalyst or the exhaust gas stream entering the SCR is too low, the $NO_x$ emissions released from the aftertreatment system may, at times, exceed a target, or regulation-specified, amount. Reductant typically cannot be dosed into the SCR until a minimum threshold temperature of the SCR has been reached. In an example of a conventional engine, SCR dosing cannot commence until the temperature of the SCR reaches a minimum of 170 degrees C. Thus, during a cold start of the engine, $NO_x$ emissions might not be adequately controlled during the time period between the cold start and the time when the minimum threshold temperature of the SCR has been reached. In conventional engine systems, it may take significant spans of time, for example, 200 seconds, for the minimum SCR dosing temperature to be reached after a cold start of the engine. Significant uncontrolled $NO_x$ emissions are generated during this cold time period, and improvements are needed in reducing such emissions.

SUMMARY

The instant disclosure is directed to a solution to the problem of inadequate control of $NO_x$ emissions during cold start of engines. An aspect of an embodiment of the present invention is an apparatus in the nature of a closed gas recycling loop of an engine exhaust aftertreatment system, configured and operated to preheat one or more components of the aftertreatment system, for example an SCR, to reduce the span of time between a cold start of the engine and the achievement of the minimum threshold temperature of the aftertreatment component. In this manner, the invention may provide a solution to aid in reduction of the amount of $NO_x$ emissions made in a cold start condition. The system may recycle gas located in the exhaust system within a closed loop including a heater. The recycling of the gas within the closed loop including a heater will speed the heating of the aftertreatment component, and reduce the amount of time between the cold start and the time when the aftertreatment component reaches a temperature threshold for operation. The recycling of the gas in the closed loop may allow earlier dosing of an aftertreatment component, such as earlier reductant dosing of an SCR. In an embodiment, a blower is included in the closed loop system to drive the recirculation of gas in the closed loop system and thereby reduce the amount of time required to add heat to the aftertreatment system.

Another aspect of an embodiment of the present invention is an engine system having an internal combustion engine, the engine system being in fluid communication with an exhaust gas aftertreatment system that includes a closed gas recycling loop including a heater for preheating at least one exhaust gas aftertreatment component, and optionally including a blower to drive recirculation of gas in the closed loop. Another aspect of an embodiment of the invention is a method that includes conducting a preheating cycle prior to releasing, from the internal combustion engine, an exhaust gas stream into the exhaust gas aftertreatment system, the preheating cycle including recirculating gas through a closed loop system including a heater and a component of the aftertreatment system to be preheated, and optionally including a blower to drive circulation of the gas in the closed loop system.

BRIEF DESCRIPTION OF THE DRAWINGS

The description herein makes reference to the accompanying figures wherein like reference numerals refer to like parts throughout the several views.

Figure 1:
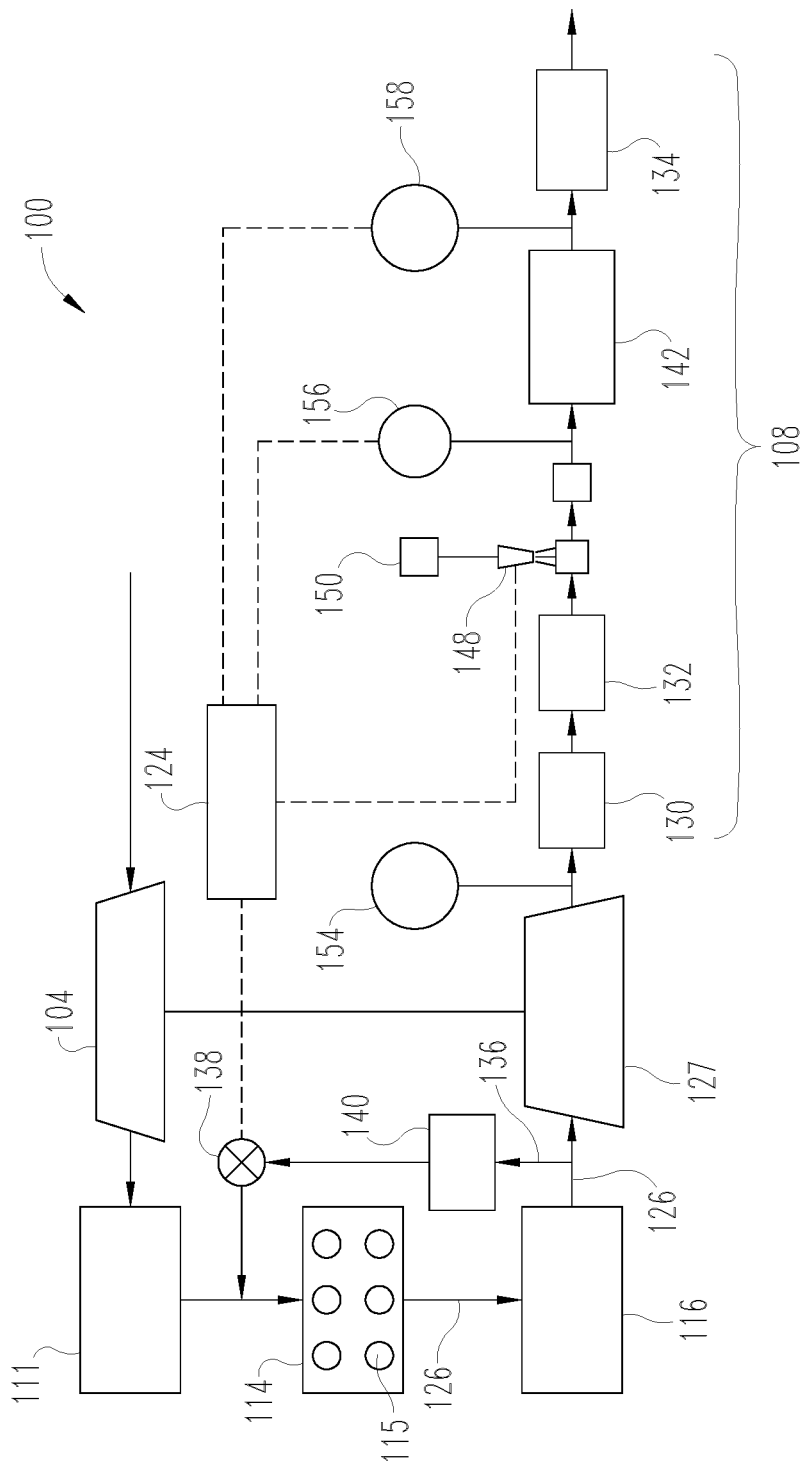
FIG. 1 illustrates a block diagram of an exemplary engine system that includes an exhaust system having an aftertreatment system that includes a selective catalytic reduction system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF ILLUSTRATIVE EMBODIMENTS

FIG. 1 is a schematic representation of a system 100 including an engine 114 and a controller 124. It will be appreciated that the illustrated configuration and components of the system 100 are but one example, and that the disclosure contemplates that a variety of different engine systems and the associated components may be utilized. Further, a variety of systems 100 may be used, such as, for example, systems including an internal combustion engine system as well as a motor or generator system, arranged to provide a hybrid system. The hybrid system may be in the form of a parallel hybrid system, a series hybrid system, or other known hybrid systems.

The internal combustion engine 114 of the engine system 100 may be fueled by a liquid fuel, such as, for example, diesel fuel or gasoline, and/or by a gaseous fuel, such as natural gas, bio-gas, methane, propane, ethanol, producer gas, field gas, liquefied natural gas, compressed natural gas, or landfill gas. In an embodiment as illustrated in FIG. 1, the engine 114 is a compression ignition internal combustion engine fueled by diesel fuel. The engine 114 may include a cylinder block that at least partially defines at least one cylinder 115 housing a reciprocating piston. The engine may include any number of cylinders 115 (six cylinders are shown in the exemplary embodiment in FIG. 1), in any configuration, such as "V", radial, or in-line, etc. The engine may include a crankshaft operably coupled to the pistons, such that internal combustion resulting in movement of the pistons will rotate the crankshaft. Thus operation of the engine 114, and/or the motor or generator system in a hybrid system, may cause the rotational movement of the crank shaft, which may be operably connected to a drive train that is used by a mechanical drive system of the system. The mechanical drive system may be used in the delivery of power to wheels of an associated vehicle, such as an on-highway vehicle, an off-highway vehicle, construction or mining equipment, a truck, bus, or passenger vehicle.

Referring again to FIG. 1, the intake system of the engine system may be configured to deliver an air flow, such as, for example, a charged air flow to an intake manifold 111 of the engine 114. According to certain embodiments, the intake system may also be used in the delivery of fuel to the engine 114, such as, for example, the gaseous fuel. The engine system may include a turbocharger system which may include a compressor 104 disposed in the path of intake air in the intake system, operably coupled to a turbine 127 disposed in an exhaust gas stream downstream of an exhaust manifold 116 of the engine 114. The exhaust system of the engine system may be configured for the delivery of at least a portion of an exhaust gas stream 126 that is generated at least in part by the operation of the engine 114 and that travels through the exhaust system. The exhaust system may include a main exhaust gas conduit 106 through which the exhaust gas flows to a tail pipe for subsequent release from the system 100 into the environment.

According to certain embodiments, the exhaust system is configured for the treatment of at least a portion of the exhaust gas stream 126, such as, for example, treatment relating to the removal or reduction of nitrogen oxide ($NO_x$) and particulates in the exhaust gas stream 126, and/or the recirculation of the exhaust gas stream 126 to the intake system or intake manifold 111 of the engine 114.

According to certain embodiments as illustrated in FIG. 1, the aftertreatment system may include, but is not limited to, an exhaust gas recirculation system (EGR), an oxidation catalyst such as a diesel oxidation catalyst (DOC) 130, a particulate filter, such as, for example, a diesel particulate filter (DPF) 132, and/or one or more ammonia oxidation catalysts ($AMO_x$) 134. As shown in FIG. 1, according to certain embodiments, the EGR system may include an EGR flow path 136, an EGR valve 138, and an EGR cooler 140. According to such an embodiment, the EGR system may be configured to recirculate at least a portion of the exhaust gas stream 126, which may be cooled by the EGR cooler 140, to an intake side of the engine 114, such as, for example, the intake system and/or the intake manifold 111.

As shown in FIG. 1, the aftertreatment system may include a selective catalytic reduction system (SCR) 142 that is configured to provide one or more SCR catalyst components that, with the aid of a reductant, convert nitrogen oxides ($NO_x$) in the exhaust gas stream 126 into nitrogen ($N_2$) and water. According to certain embodiments, the SCR 142 includes a reductant injector or doser 148 and one or more SCR catalyst components. The reductant doser 148 is in fluid communication with a reductant source 150, and may be controllable by the controller 124. The reductant source 150 may contain a reductant, such as, for example, ammonia ($NH_3$), urea, and/or a hydrocarbon, that is supplied for injection by the reductant doser 148 into the exhaust gas stream 126 at a position upstream of the SCR 142. The controller 124 may be configured to both determine a ratio of reductant to $NO_x$ in the exhaust gas stream 126, such as, for example, an ammonia to $NO_x$ ratio (ANR) during operation of the engine 114, and to adjust the operation of the reductant doser 148 to achieve a target reductant to $NO_x$ ratio.

The one or more SCR catalyst components are configured to at least assist in the reductant reacting with $NO_x$ to reduce the amount of $NO_x$ in the exhaust gas stream 126. Further, according to certain embodiments, the aftertreatment system may include at least one engine-out $NO_x$ sensor 154 that may detect a $NO_x$ level in the exhaust gas stream 126 upstream of the SCR 142. In the illustrated embodiment, one or more of the engine-out $NO_x$ sensors 154 may be positioned upstream of the DOC 130, the DPF 132, and/or the reductant doser 148. Further, according to the illustrated embodiment, the engine-out $NO_x$ sensor 154 may provide a signal for the controller 124 that indicates, and/or is used in determining, a level of $NO_x$ in the exhaust gas stream 126 at a location upstream of the reductant doser 148. Alternatively, the quantity of engine-out $NO_x$ may be modeled, calculated from an engine operation map, and/or measured from a different location than the location of the engine-out $NO_x$ sensors 154 shown in FIG. 1.

Referring again to FIG. 1, the aftertreatment system may also include at least one temperature sensor 156 that is in communication with the controller 124. The temperature sensor 156 may be any suitable device, including but not limited to a thermocouple, thermistor, and pyrometer. Further, the SCR inlet exhaust gas temperature and/or the temperature of the SCR catalyst 142 may be determined in a variety of different manners, including, for example, at least by utilizing a weighted average of temperature sensors 156 that are positioned upstream and downstream of the SCR 142, or modeling and/or estimating the temperature of the SCR 142 based upon other temperature measurements available in the engine system 104, and more specifically within the aftertreatment system 108. Further, the temperature sensor 156 may be used to determine an inlet temperature of the exhaust gas stream 126, such as, for example, the temperature of the exhaust gas stream 126 that is upstream of the SCR 142, at or around an inlet of the SCR 142, and/or is positioned to detect the temperature of one or more components of the SCR 142. Further, one or more temperature sensors 156 may be positioned downstream of the SCR 142. Additionally, according to certain embodiments, the aftertreatment system 108 may further include an ammonia (NH$_3$) sensor 158, which may detect a level(s) of ammonia present in exhaust gas stream 126 that is being exhausted or otherwise released from the engine system.

The controller 124, which may be configured to control various operational aspects of system 100, may be implemented in a number of ways. Further, the controller 124 may execute operating logic that defines various control, management, and/or regulation functions. The operating logic may be in the form of one or more microcontroller or microprocessor routines stored in a non-transitory memory, dedicated hardware, such as a hardwired state machine, analog calculating machine, various types of programming instructions, and/or other forms as would occur to those skilled in the art.

Additionally, the controller 124 may be provided as a single component, or a collection of operatively coupled components, and may comprise digital circuitry, analog circuitry, or a hybrid combination of both of these types. When of a multi-component form, the controller 124 may have one or more components remotely located relative to the others in a distributed arrangement. The controller 124 can include multiple processing units arranged to operate independently, in a pipeline processing arrangement, in a parallel processing arrangement, or the like. In one embodiment, the controller 124 includes several programmable microprocessing units of a solid-state, integrated circuit type that are distributed throughout the system 100 that each includes one or more processing units and non-transitory memory. For the depicted embodiment, the controller 124 includes a computer network interface to facilitate communications using standard Controller Area Network (CAN) communications or the like among various system control units. It should be appreciated that the depicted modules or other organizational units of the controller 124 refer to certain operating logic performing indicated operations that may each be implemented in a physically separate controller of the controller 124 and/or may be virtually implemented in the same controller.

The description herein including modules and/or organizational units emphasizes the structural independence of the aspects of the controller 124, and illustrates one grouping of operations and responsibilities of the controller 124. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 124 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The controller 124 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications. Certain operations described herein include operations to interpret or determine one or more data points or parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated or estimated, and/or by referencing a default value that is interpreted or determined to be the parameter value.

As shown in FIG. 1, the controller 124 is operably connected to a variety of components of the system 100, including, for example, the aftertreatment system 108. Such connections may allow for the communication of information, data, and/or commands between the controller 124 and components of the system 100 that are used in connection the operation and performance of the system 100, including, but not limited to, various actuators controlled in the management of the aftertreatment system. According to the illustrated embodiment, the controller 124 is structured to functionally execute operations of the engine system, such as, for example, operations relating the aftertreatment system 108, such as, for example, the SCR 142. For example, an exemplary controller 124 may include one or more SCR control modules, including, for example, a system conditions module, a NO$_x$ modeling module, a NO$_x$ reference module, a NO$_x$ error determination module, a NO$_x$ control module, and/or a doser control determination module.

According to certain embodiments, the thermal management of the aftertreatment system 108 entails at least attempting to optimize NO$_x$ conversion by the SCR 142. NO$_x$ conversion efficiency of the SCR 142 may be adversely impacted when the inlet temperature of the exhaust gas stream 126 entering into the SCR 142 and/or the temperature of the SCR catalyst component is/are below certain temperatures. The system may be operating in a condition, such as a cold start condition, where the inlet temperature of the exhaust gas stream 126 entering into the SCR 142 and/or the temperature of the SCR catalyst component is/are so low as to adversely impact the NO$_x$ conversion efficiency of the SCR 142.

Figure 2:
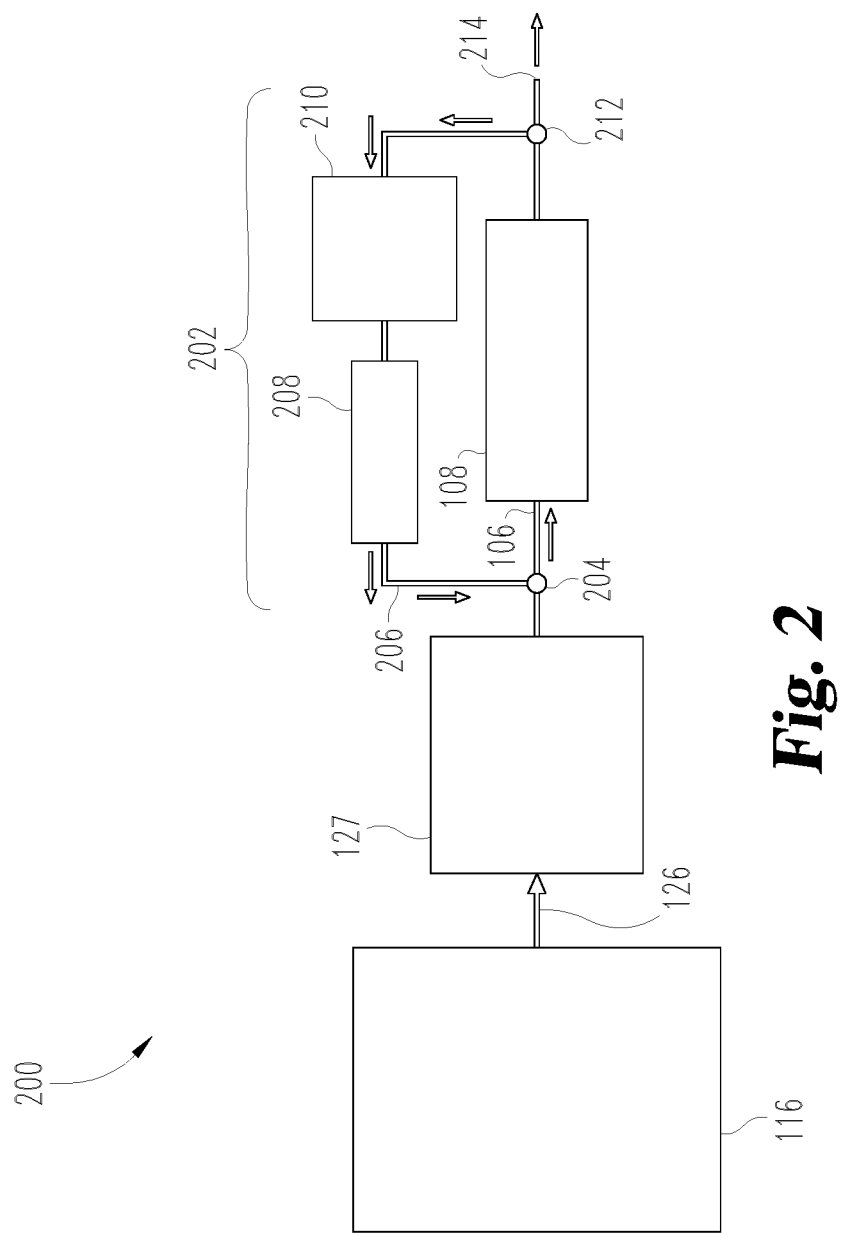
FIG. 2 illustrates a block diagram of an exemplary engine system including a recycling loop according to an aspect of the invention.

FIG. 2 illustrates a block diagram of an exemplary engine system 100 according to an aspect of the invention. The engine system 100 includes an exhaust gas recycling loop 202 designed to reduce the time required to achieve the minimum threshold operating temperature of at least one component of the aftertreatment system 108. The time span may be measured from the time of a cold start of the engine to the time an operating temperature has been reached by at least one component of the aftertreatment system. The operating temperature of the least one component of the aftertreatment system may optionally include a value for a threshold operating temperature stored in an element of a controller of the engine system 100. The threshold operating temperature may optionally be a minimum temperature at which a dosing event is to be conducted with respect to the aftertreatment component, based on one or more values stored in an element of a controller of the engine system. The components of the aftertreatment system may include an SCR 142. The recycling loop 202 may be configured to recirculate exhaust gas through at least part of the aftertreatment system 108, thereby lowering the amount of time required to achieve the minimum threshold temperature of components of the aftertreatment system 108 such as, in an exemplary embodiment, the SCR 142.

As seen in FIG. 2, the recycling loop 202 may be formed within a portion of the main exhaust gas conduit 106 and a recycling loop conduit 206. An upstream valve 204 connecting the portion of the exhaust gas conduit 106 with the recycling loop conduit 206 may be disposed in fluid communication with the exhaust gas conduit 106 and the recycling loop conduit 206 in a position upstream of at least one component of the aftertreatment system 108, and downstream of the exhaust manifold of the internal combustion engine. In an embodiment, it may be preferred to have the upstream valve 204 located at the junction between the exhaust gas conduit 106 and the recycling loop conduit 206, so that the valve 204 may close off the recycling loop conduit 206 from the exhaust gas conduit 106 in certain conditions. In an embodiment, it may be preferred to have the upstream valve 204 located at the junction between the exhaust gas conduit 106 and the recycling loop conduit 206 at a position that is upstream of all of the components of the aftertreatment system so that all components may be heated by the activity of the recycling loop 202. As shown in the illustrative embodiment of FIG. 2, the upstream valve 204 may be located at a position downstream of a turbine 127 of a turbocharger system of the engine system. The upstream valve 204 may preferably be constituted as a two-way or three-way valve adjustable to permit selective opening and closing of the junction providing fluid communication between the recycling loop conduit 206 and the exhaust gas conduit 106. The upstream valve 204 may be constituted to form an outlet from the recycling loop conduit 206 to the exhaust gas conduit 106, permitting entry of exhaust gas back into the exhaust gas conduit 106 after the gas has passed through the recycling loop conduit 206. The selective opening and closing may be conducted by actuators in response to signals provided by the controller 124. The selective opening and closing may include partial opening or closing, or complete opening and closing, of the junction between the recycling loop conduit 206 and the exhaust gas conduit 106.

The recycling loop 202 may preferably include a downstream valve 212. The downstream valve 2012 preferably may be disposed to provide a fluid connection between the portion of the exhaust gas conduit 106 that is included within the recycling loop 202, and the recycling loop conduit 206. The downstream valve 212 preferably may be disposed in a position downstream of at least one component of the aftertreatment system 108, and upstream of a tail pipe 214 of the engine system 100, where the exhaust gas enters the ambient environment. In an embodiment, the downstream valve 212 may be disposed in a position that is downstream of all of the components of the aftertreatment system 108. The downstream valve 212 may preferably be constituted as a two-way or three-way valve adjustable to permit selective opening and closing of a junction providing fluid communication between the recycling loop conduit 206 and the exhaust gas conduit 106. The downstream valve 212 may be constituted to form an inlet into the recycling loop conduit 206 from the exhaust gas conduit 106, permitting entry of gas from the exhaust gas conduit 106 into the recycling loop conduit 206. The downstream valve preferably may be disposed at the junction between the recycling loop conduit and an end part of the portion of the exhaust gas conduit 106 that is included in the recycling loop 202. The downstream valve preferably may be controlled and configured to be selectively held in a closed position, in a condition in which passage of gas from the exhaust gas conduit 106 through the tail pipe 214 is prevented. The selective opening and closing may be conducted by actuators in response to signals provided by the controller 124. The selective opening and closing may include partial opening or closing, or complete opening and closing, of the junction between the recycling loop conduit 206 and the exhaust gas conduit 106.

It is understood that complete opening or closing of any valve in an engine system, including for example downstream valve 212 and upstream valve 204, may comprise essentially complete opening and closing. It is known that some leakage through a valve into a particular outlet may occur even when the valve is disposed in a position that is configured to be its fully closed position with respect to that particular outlet.

As shown in FIG. 2, the recycling loop 202 may preferably include a source of heat disposed in a position to increase the temperature of exhaust gas in the recycling loop conduit 206. The heat source may be constituted as a heater 208 or a heating element. The heater or heating element may be powered by electricity provided by a battery or generator of the system, or by other known means of raising the temperature of a gas. In an embodiment, the heat source may be another component of the engine system that generates heat while performing other functions in the engine system, or another component that generates heat that ordinarily is directed to heating other components of the engine system. The heater 208 may be selectively activated or deactivated in response to signals provided by the controller 124.

The recycling loop 202 may preferably include a device or structure configured for driving or propelling the movement of gas, such as a fan or a blower 210, disposed in a position to drive a flow of gas within the recycling loop conduit 206. The blower 210 may be disposed to drive the flow of gas within the recycling loop conduit 206 in a direction toward the upstream valve 204. The blower 210 thus may be positioned and disposed to drive the flow of gas through the recycling loop conduit toward the outlet from the recycling loop conduit 206 and into the exhaust gas conduit 106. The direction of flow driven by the blower is indicated by arrows in FIG. 2. The blower 210 may be selectively activated or deactivated in response to signals provided by the controller 124.

In a condition wherein increasing temperature of components of the aftertreatment condition is desirable, such as an engine cold start condition, the operation of the recycling loop may be controlled as follows. Prior to start of operation of the internal combustion engine, a preheating cycle may commence. During the preheating cycle, both the upstream valve and the downstream valve are controlled to be adjusted to a position that forms a closed loop within the recycling loop conduit 206 and the portion of the exhaust gas conduit 106 that extends between the upstream valve and the downstream valve, such that gas is contained within the closed loop. The blower 210 may be activated to drive flow of the gas within the closed loop to circulate the gas around the closed loop. The heater 208 is activated to heat the gas within the closed loop. As the gas within the loop repeatedly circulates around the closed loop, the gas is warmed, and then re-warmed, when it is in proximity to the heater. Thus the temperature of the gas is raised in an efficient manner, because the gas warmed by the heater has a higher starting temperature than ambient temperature upon its second and subsequent circulations around the closed loop. The warmed gas recirculating around the closed loop reaches the vicinity of the components of the aftertreatment system that are disposed along the portion of the exhaust gas conduit that extends between the upstream valve and the downstream valve. The temperature of the components is raised by the recirculating gas in the closed loop.

The preheating cycle conducted using the closed loop yields an increase in the temperature of the aftertreatment components in an improved and efficient manner, because the recirculation of the warmed gas within the closed loop provides a condition wherein heat loss to the outside of the closed loop system is minimized. In an exemplary application of the preheating cycle using the closed loop system as depicted in FIG. 2, assuming that the blower is calibrated to drive air flow within the loop at a rate of 0.2 m/s, the length of the closed loop is 2 meters, and the heater 208 is calibrated to increase the temperature of gas passing through the loop by 100 degrees C., the inventors estimate that the time span from start of the preheating cycle to a time when the SCR is preheated to an operating temperature of 200 degrees C. may be reduced to 20-30 seconds. This contrasts with an example of a conventional engine system wherein the SCR is heated to reach its operating temperature only by passing exhaust gas from the internal combustion engine through the SCR. Also, the closed loop system provides an efficient design solving the problem of complexity of other designs that have required an air source or air reservoir in order to supply gas to be warmed and passed through an aftertreatment component.

At a point in time during the preheating cycle at which the aftertreatment components in the vicinity of the closed loop reach a minimum threshold temperature for operation, the preheating has been accomplished and the preheating cycle may be deactivated. The start procedure for the internal combustion engine may be activated. Deactivation of the preheating cycle may include controlling the adjustment of the upstream valve 204 and downstream valve 212 so as to close the junctions between the recycling loop conduit 206 and the exhaust gas conduit 106. In this manner, the exhaust gas stream may flow from the engine into the exhaust gas conduit 106 and through the aftertreatment system 108, without entering the recycling loop 202, in a warm run condition. A benefit of closing the inlet and outlet of the recycling loop conduit 206 during a warm run condition is isolation of the heater 208 and blower 210 in the recycling loop from the exhaust gas stream during operation of the internal combustion engine. The isolation may aid in preventing premature deterioration of the heater 208 and blower 210 by limiting exposure of the heater 208 and blower 210 to the exhaust gas stream in conditions where the exhaust gas stream has a high temperature, or contains corrosive exhaust gas components, that might cause deterioration of the heater and/or blower. In this manner, the isolation may aid in extending the service life and decreasing maintenance requirements of the heater 208 and/or blower 210.

Figure 3:
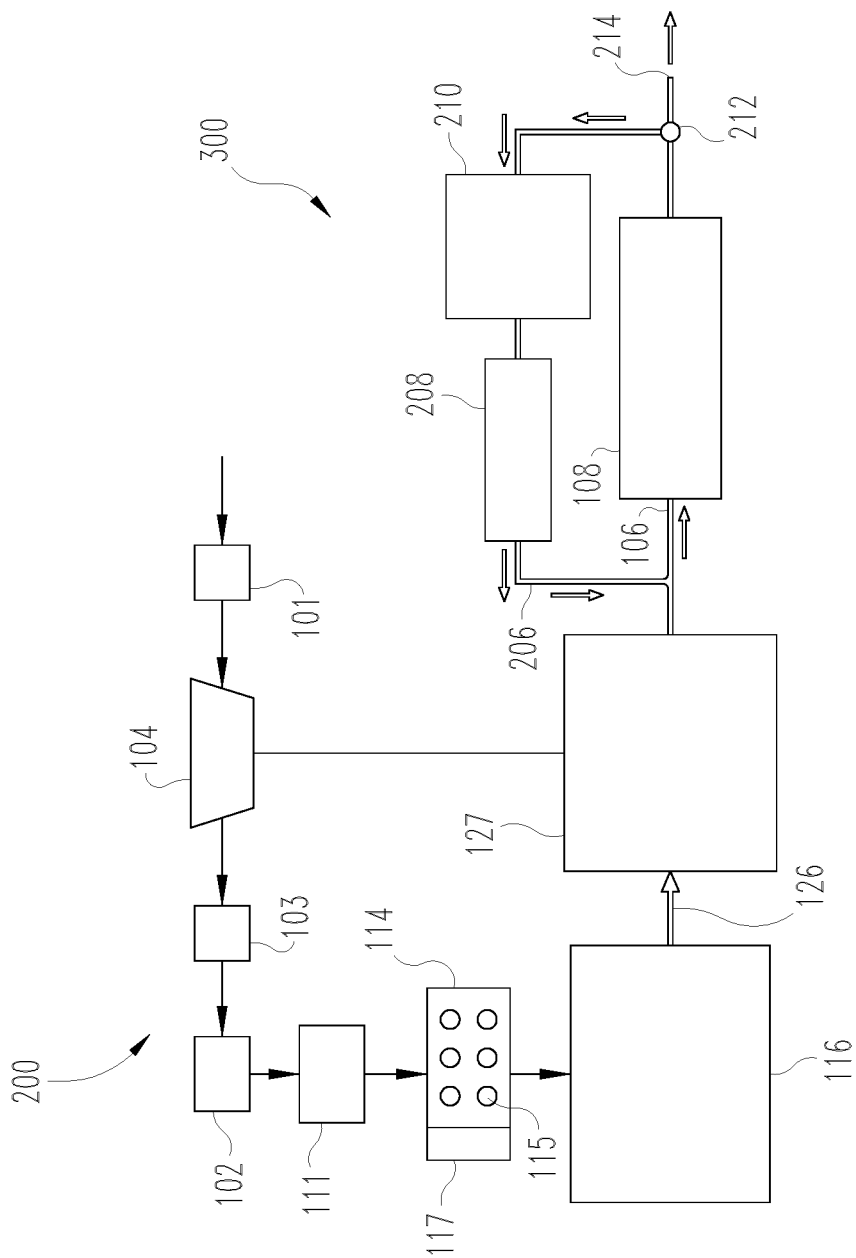
FIG. 3 illustrates a block diagram of an exemplary engine system including a recycling loop according to another aspect of the invention.

FIG. 3 illustrates a block diagram of another exemplary engine system 300 according to an aspect of the invention. In FIG. 3, there is illustrated a system 300 including a downstream valve 212 as in FIG. 2. In FIG. 3, there is illustrated a closed recycling loop system, but the closed recycling loop system does not include an upstream valve 204 as in the embodiment shown in FIG. 2. Instead, the recycling loop system is closed functionally by air flow restrictions provided by other elements of the engine system 300. For example, in a condition wherein the cylinders 115 in the internal combustion engine 114 are not operating, a preheating cycle may be conducted to preheat gas present in the aftertreatment system. The downstream valve 212 as shown in FIG. 3 is selectively controlled by actuators in response to signals provided by the controller 124 to be in a closed position with respect to the outlet to the tail pipe 214 (and hence, closed to ambient). The downstream valve 212 is in an open position with respect to a junction between the recycling loop conduit 206 and the portion of the exhaust gas conduit 106 that is upstream of the downstream valve 212. In this manner, there is a fluid connection between the recycling loop conduit 206 and all of the exhaust gas conduit 106 that is upstream of the downstream valve 212. In this condition, the blower 210 may be activated to drive flow of the gas within the closed loop to circulate the gas around the closed loop. The heater 208 may be activated to heat the gas within the closed loop. As the gas within the loop repeatedly circulates around the closed loop, the gas is warmed, and then re-warmed, when it is in proximity to the heater, and as in the configuration of FIG. 2, the temperature of the components is raised by the recirculating gas in the closed loop.

The gas flow restrictions that may functionally or essentially close the upstream side of the closed recycling loop system may be provided by one or more components of the engine system as depicted in FIG. 3. For example, several components in known engine systems may provide gas backflow restrictions or backpressure. For example, the turbine 127 of a turbocharger system positioned downstream of an exhaust manifold may provide a backpressure or gas flow restriction. A turbine 127 generally is configured to allow gas flow only in one direction, namely a direction downstream from the exhaust manifold 116. A variable geometry turbocharger (VGT) system may provide additional restriction, if turbine 127 of the VGT is controlled by actuators to be in a closed-down condition wherein the geometry is restricted to a small volume.

In another example, cylinder head valves of the cylinders 115 of the engine 114 may restrict gas from backflowing in a direction toward an intake manifold 111 of the engine system 300. In exemplary cylinder head valve control conditions, at any given time, it may be typical for four (4) cylinders out of six (6) to have their exhaust valves closed, assuming a traditional valvetrain design with typical ranges for valve lift. In this first valve control condition, as to the remaining exhaust valves of a cylinder that are open, the gas flow would enter the cylinder, but would be blocked from further flow upstream in the intake system by the closed cylinder intake valves. In this situation, the flow must enter the crankcase past the piston rings. The barrier of the piston rings presents a high level of restriction of backflow, as in typical engine systems there may normally be less than 1% (one percent) of gas flow that escapes past piston rings in a condition wherein internal combustion is occurring in the cylinders. Thus, in the conditions at hand wherein combustion is not occurring, only a small amount of gas flow would pass the piston rings into the crankcase. A crankcase ventilation system 117 is schematically represented as affixed to the engine 114 in FIG. 3. One or more components of the crankcase ventilation system 117, such as a breather, may offer additional gas backflow restriction. In an open crankcase ventilation system (OCV) system, gas backflow would exit the engine system to atmosphere. However, in a closed crankcase system, the gas backflow would pass through the breather into a compressor inlet pipe. To continue flowing into the intake system, the gas backflow must pass through the air filter (another restriction) and out to atmosphere. These present additional restrictions on backflow of gas.

In a second valve control condition, one of the cylinders may be in an overlap condition. In a typical six-cylinder engine control condition, only one cylinder at a time will be in an overlap condition. In this second valve control condition (overlap), the intake and exhaust valves of the cylinder are open at the same time, but only have a small open gap, about 0.5 mm, in a typical control condition. Although there is a gap, it is a small one, and will not significantly diminish the restriction against gas backflow offered by other components of the engine system 300.

In either of the first or second valve control conditions described above, if the gas backflow is to continue from the engine 114 through the intake path and out to atmosphere, the backflow must pass through the intake manifold. If the gas backflow continues, the backflow further must pass through a charge air cooler 102, provided in an exemplary embodiment as shown in FIG. 3, which may offer further restriction to gas backflow by reason of its geometry designed for flow in the opposite direction. If the gas backflow continues, the backflow further must pass through an air intake throttle 103, provided in an exemplary embodiment as shown in FIG. 3, which preferably may be controlled by actuators to be in a closed position via commands from the controller, thus increasing restriction to gas backflow. If the gas backflow continues, it further must pass through a compressor 104 of a turbocharger system of the engine system 300, provided in an exemplary embodiment as shown in FIG. 3. The compressor 104 may offer further restriction to gas backflow by reason of its geometry designed for gas flow in the opposite direction, toward the intake manifold 111. If the gas backflow continues beyond the compressor 104, the backflow further must pass through an intake air filter 101 of the engine system 300, provided in an exemplary embodiment as shown in FIG. 3. The intake air filter 101 may offer further restriction to gas backflow by reason of its geometry designed for flow in the opposite direction.

In summary, the closed recycling loop system as illustrated in FIG. 3 may be closed on the upstream side by the restrictions to backflow provided by any one of, or any combination of one or more of, the engine components described above, which may preferably include one or more of the turbine of a turbocharging system, cylinder head valves, piston rings, crankcase ventilation components, a charge air cooler, an air intake throttle, a compressor of a turbocharging system, and an intake air filter.

Figure 4:
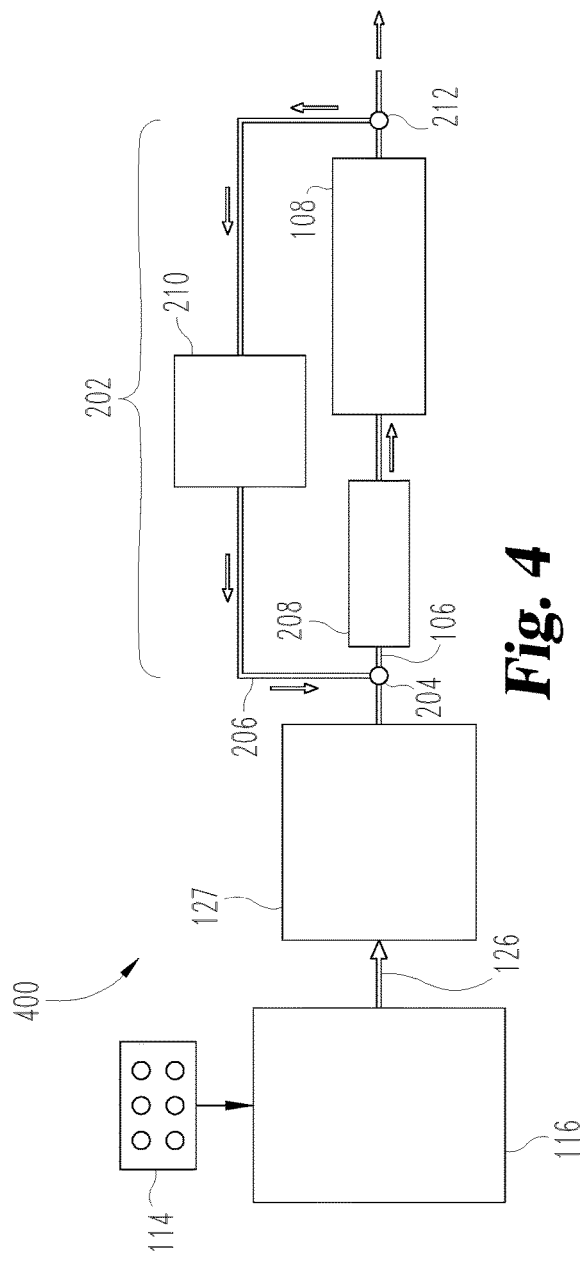
FIG. 4 illustrates a block diagram of another exemplary engine system including a recycling loop according to another aspect of the invention.

FIG. 4 illustrates a block diagram of another exemplary engine system 400 according to an embodiment of the invention. The system 400 of FIG. 4 includes a closed recycling loop according to an aspect of the invention. As shown in the exemplary system of FIG. 4, a recycling loop construction similar to that of FIG. 2 is provided, except that the heater is disposed on the exhaust gas conduit 106 instead of being disposed on the recycling loop conduit 206 as in FIG. 2. In a preheating cycle, the gas may be circulated within the closed loop formed by the recycling loop conduit 206 and that portion of the exhaust gas conduit 106 that is disposed between the upstream valve 204 and the downstream valve 212. The gas circulates in the direction indicated by the arrows in FIG. 4. Here, benefits of recycling of preheated gas through the recycling loop 202 may be enhanced by lowering the distance between the position of the heater 208 and the position of one or more aftertreatment components of the aftertreatment system 108 that are positioned on the recycling loop 202. In this manner, the one or more aftertreatment components of the aftertreatment system 108 positioned in the recycling loop 202 may be heated more quickly and more efficiently, in view of the lesser distance between the heater 208 and the aftertreatment components of the aftertreatment system 108 positioned in the recycling loop 202, lowering the amount of heat lost by the gas as it travels the span between the heater 208 and the aftertreatment components of the aftertreatment system 108 during recycling.

The construction of FIG. 4 also provides a benefit of flexibility, in that the heater 208 may be activated even when the recycling loop 202 is deactivated, with its inlet and outlet junctions with the exhaust gas conduit 106 closed. In this manner, the heater 208 may be utilized according to operating conditions and commands regardless of activation of the recycling loop 202. At a point in time during the preheating cycle at which the aftertreatment components in the vicinity of the closed loop reach a minimum threshold temperature for operation, the preheating has been accomplished and the preheating cycle may be deactivated. The start procedure for the internal combustion engine may be activated.

Figure 5:
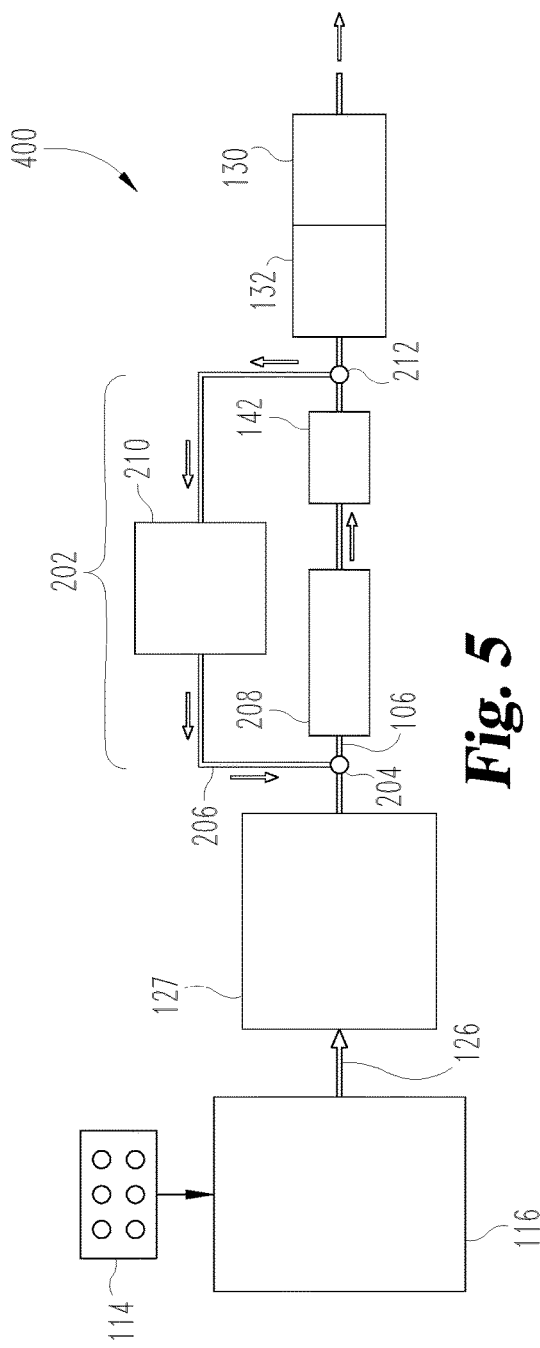
FIG. 5 illustrates a block diagram of another exemplary engine system including a recycling loop according to another aspect of the invention.

FIG. 5 illustrates a block diagram of another exemplary engine system 500 including a recycling loop according to an aspect of the invention. In an aspect of the invention, preheating only one or more specific components of an aftertreatment system, for example, preheating an exemplary aftertreatment unit that comprises at least one SCR 142, instead of preheating the entire aftertreatment system, may increase efficiency in some circumstances. In an example, preheating only a specific aftertreatment component such as an SCR may provide a more efficient way to improve the $NO_x$ convection rate for a cold start condition. In the example of FIG. 5, other aftertreatment components may be disposed in an aftertreatment system 108 that is positioned downstream of the closed recycling loop 202. In the example of FIG. 5, the components of the aftertreatment system 108 positioned downstream of the closed recycling loop 202 may or may not contain an additional SCR. In the example shown in FIG. 5, the aftertreatment unit comprising at least one SCR 142 may also comprise at least one DOC. In the example shown in FIG. 5, other aftertreatment components of the system 108 may include, for example, a DOC 130 and/or a DPF 132 disposed downstream from the recycling loop 202 and upstream of the tail pipe 214 of the exhaust system.

In a preheating cycle, the gas may be circulated within the closed loop formed by the recycling loop conduit 206 and that portion of the exhaust gas conduit 106 that is disposed between the upstream valve 204 and the downstream valve 212. In the preheating cycle, the gas circulates in the direction indicated by the arrows in FIG. 5. At a point in time during the preheating cycle at which the aftertreatment components in the vicinity of the closed loop reach a minimum threshold temperature for operation, the preheating has been accomplished and the preheating cycle may be deactivated. The start procedure for the internal combustion engine may be activated.

Figure 6:
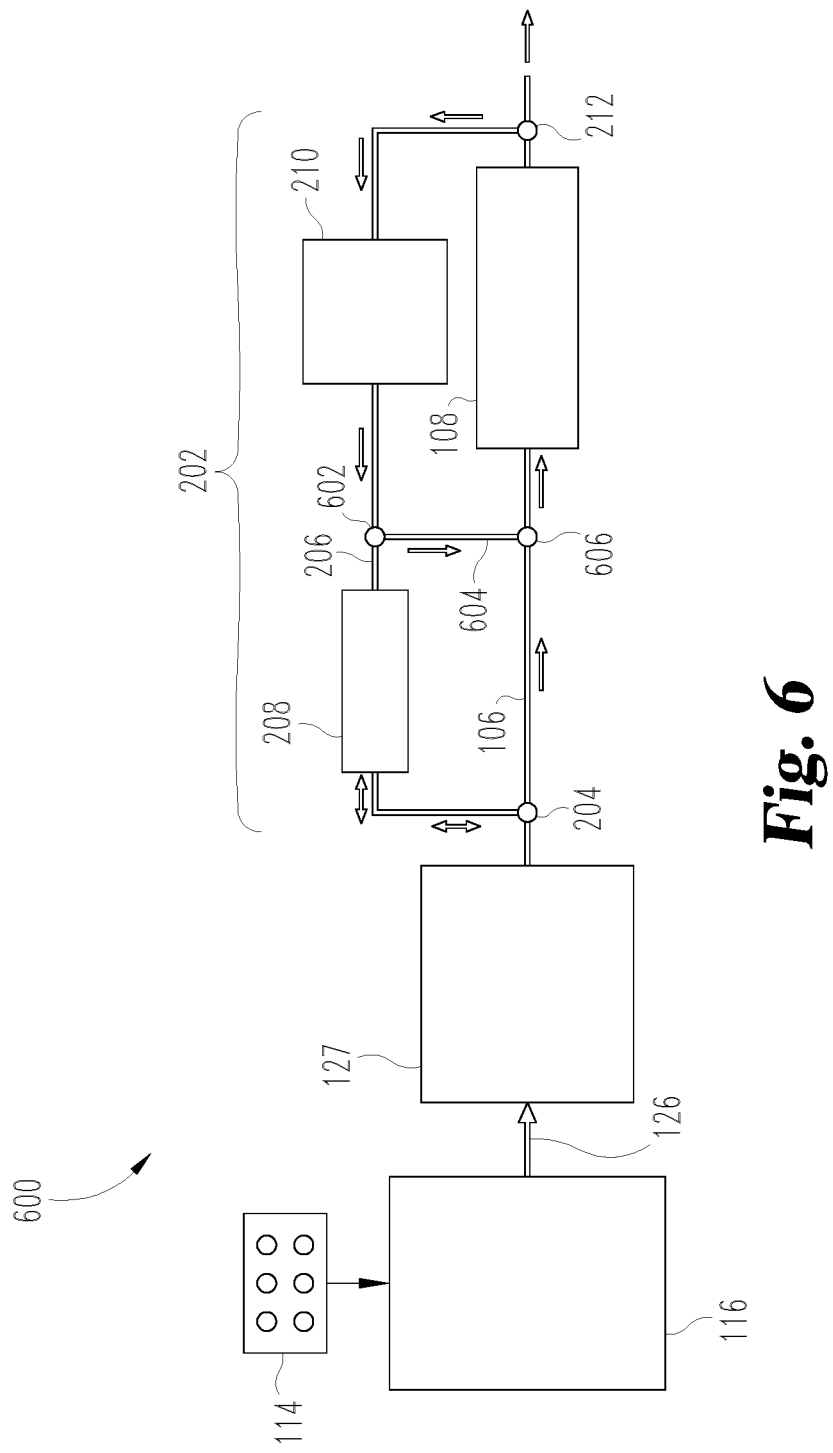
FIG. 6 illustrates a block diagram of another exemplary engine system including a recycling loop with a bypass, according to another aspect of the invention.

FIG. 6 illustrates a block diagram of another exemplary engine system 600 including a recycling loop according to an aspect of the invention. In this aspect of the invention, the system 600 may include a recycling loop 202 for recycling at least a portion of the exhaust gas flowing through the main exhaust gas conduit 106. The recycling loop 202 may include a recycling loop conduit 206. There may be disposed along the recycling loop conduit 206 a blower 210 and a heater 208. In the example shown in FIG. 6, the blower 210 is disposed to direct a flow of exhaust gas from the main exhaust gas conduit 106, through the inlet into the recycling loop conduit 206 at the downstream valve 212. The blower may direct flow of the exhaust gas through the recycling loop conduit 206 toward the heater 208.

In the exemplary configuration depicted in FIG. 6, there may be disposed on the recycling loop conduit 206, between the blower 210 and the heater 208, a first bypass valve 602. The first bypass valve 602 may be constituted to form an inlet into a bypass conduit 604 from the recycling loop conduit 206. The first bypass valve 602 may selectively permit entry of gas from the recycling loop conduit 206 into the bypass conduit 604. Selective opening and closing of the first bypass valve 602 may be conducted by actuators in response to signals provided by the controller 124. The selective opening and closing of the first bypass valve 602 may include partial opening or closing, or complete opening and closing, of the junction between recycling loop conduit 206 and the bypass conduit 604.

As seen in FIG. 6, when at least partially opened to the bypass conduit 604, the first bypass valve 602 may direct flow of exhaust gas through the bypass conduit 604 toward a second bypass valve 606. The second bypass valve 606 may be constituted to form an outlet from the bypass conduit 604 to the main exhaust gas conduit 106. The second bypass valve 606 may be disposed along the exhaust gas conduit 106 at a position that is downstream (with respect to the direction of exhaust gas flow in the conduit 106) of the upstream valve 204. The second bypass valve 606 may be disposed along the exhaust gas conduit 106 at a position that is upstream (with respect to the direction of exhaust gas flow in the main exhaust gas conduit 106) upstream of one or more of the aftertreatment components of the aftertreatment system 108.

The second bypass valve 606 may selectively permit entry of gas from the bypass conduit 604 into the exhaust gas conduit 106. Selective opening and closing of the second bypass valve 606 may be conducted in response to signals provided by the controller 124. The selective opening and closing of the second bypass valve 606 may include partial opening or closing, or complete opening and closing, of the junction between the bypass conduit 604 and the main exhaust gas conduit 106. The selective opening and closing of the second bypass valve may be controlled according to programming instructions issued by one or more component of the controller 124. The programming instructions may include controls of adjusting the opening and closing of one or more of the group of valves including the upstream valve 204, the downstream valve 212, the first bypass valve 602, and the second bypass valve 606. These controls may provide a number of control options. For example, a design as shown in FIG. 6 may offer a number of programmable control options, such as circulation of gas: (1) through the recycling loop including heater, blower, and aftertreatment components; (2) solely through aftertreatment components without use of the recycling loop conduit; and (3) through the heater and aftertreatment components.

In an example, the operation of the configuration in FIG. 6 may be controlled as follows. In a first exemplary control condition, gas may recirculate within the recycling loop 202 in a closed loop system, similarly to the gas recirculation through the closed loop configuration shown in FIG. 2. The upstream valve 204 and the downstream valve 212 are controlled to be in a position to direct gas to recirculate within the closed recycling loop 202. Meanwhile, the bypass conduit 604 may be held in a closed condition, by setting bypass inlet valve 602 to a position that closes the inlet to the bypass conduit 604 and setting bypass outlet valve 606 to a position that closes the outlet from the bypass conduit 604 to the main exhaust gas conduit 106. In this manner, the bypass conduit 604 is isolated from remainder of the recycling loop 202. In this condition, a preheating cycle prior to engine start may be conducted. The heater 208 may be activated to preheat gas circulating around the recycling loop 202, propelled by the operation of the blower 210. The preheating cycle may warm the gas circulating within the closed recycling loop 202. The warmed gas circulating within the closed loop thus preheats the aftertreatment components of the aftertreatment system 108 disposed in the closed loop 202 prior to engine start, thus reducing the time period between the cold start of the engine 114 and the point in time at which the aftertreatment components of the aftertreatment system 108 reach a minimum temperature for effective operation and/or dosing, for example, for SCR dosing.

At a point in time during the preheating cycle at which the aftertreatment components positioned in the vicinity of the closed recycling loop 202 reach a minimum threshold temperature for operation, the preheating has been accomplished and the preheating cycle may be deactivated. The start procedure for the internal combustion engine 114 may be activated.

In another exemplary control condition of the configuration depicted in FIG. 6, a keep-warm cycle may be conducted. In the keep-warm cycle, the engine 114 has been started and is in an operating condition producing a flow of exhaust gas. In conditions where it may be desirable to increase the temperature of at least a portion of the exhaust gas that is emitted by the operating engine and is flowing into the main exhaust gas conduit 106, upstream valve 204 may be controlled to be in a position that allows at least a portion of the exhaust gas stream to flow from the exhaust gas conduit 106 into the recycling loop conduit 206 via upstream valve 204. In an embodiment of the keep-warm cycle, the flow of the exhaust gas through the portion of the recycling loop conduit 206 is driven by the pressure caused by ejection of exhaust gas from the internal combustion engine, instead of being driven by operation of the blower 210. The exhaust gas flowing into the recycling loop conduit 206 via upstream valve 204 may enter the vicinity of the heater 208. The heater 208 may be activated to be in an operating condition by the controller 124. The exhaust gas thus may be warmed by action of the heater 208. The exhaust gas may continue to flow through a portion of the recycling loop conduit 206 that is downstream of the heater 208 to reach the first bypass valve 602. The first bypass valve 602 may be controlled to be in a position that allows at least a portion, and preferably all, of the exhaust gas to flow from the recycling loop conduit 206 into the bypass conduit 604 via the first bypass valve 602. The second bypass valve 606 may be controlled to be in a position that allows the warmed exhaust gas flowing through the bypass conduit 604 to flow into the main exhaust gas conduit 106 via the second bypass valve 606. In this manner, a temperature of at least a portion of the exhaust gas may be increased due to action of the heater 208 on the exhaust gas flowing through the open portion of the recycling loop conduit 206.

The controller 124 may command activation of a keep-warm cycle in conditions where the engine is operating, but an increase in the temperature of the exhaust gas entering the aftertreatment system 108 is desirable. In this condition, the portion of the recycling loop conduit 206 that includes the blower 210 may optionally remain isolated from the rest of the recycling loop 202 by control of the positions of the first bypass valve 602 and the downstream valve 212. In this condition, the blower 210 may remain in a non-operating condition.

As may be appreciated from the directional arrows in FIG. 6 depicting the directions of gas flow, the portion of the recycling loop conduit 206 disposed between the upstream valve 204 and the first bypass valve 602 may have gas circulating within it in two different directions during different operating modes. In the preheating operating mode previously described, in a closed loop condition, the valves 204, 602, 606, and 212 may be controlled such that gas will flow in a direction from the downstream valve 212 into the recycling loop conduit 206, then toward the blower 210, then toward the first bypass valve 602, then toward the heater 208, then toward the upstream valve 204, and then through the portion of the main exhaust gas conduit 106 that is included within the closed recycling loop 202. The gas then continues to recycle within the closed loop, propelled by operation of the blower 210. In contrast, in the keep-warm operating mode previously described, the valves 204, 602, 606, and 212 may be controlled such that gas will flow from the exhaust manifold of the engine 114 through upstream valve 204 into the recycling loop conduit 206, through the heater 208, then through the first bypass valve 602 into the bypass conduit 604, and then through the second bypass valve 606 into the main exhaust gas conduit 106 toward the aftertreatment components 108.

A solution offered by the constructions of any one of FIGS. 2-6 is that dosing of any one or more of the aftertreatment components of the aftertreatment system may be conducted at a position that is or may be isolated from the blower and/or the heater of the recycling loop 202 by operation of one or more of the valves 204, 212, 602, and 606. For example, one or more of the valves 204, 212, 602, and 606 may be controlled by the controller in a manner that isolates the recycling loop conduit 206 on which the blower is positioned during or after a dosing event conducted in the aftertreatment component. In this manner, deterioration of the blower and/or heater that otherwise might be caused by contact with dosing materials, such as a reductant, may be at least partially avoided.

The configurations depicted in FIGS. 2-6 may be employed in a variety of systems, such as, for example, systems including an internal combustion engine system as well as an electric motor or generator system, arranged to provide a hybrid system. In some hybrid systems, it is beneficial to position a particulate filter, such as a diesel particulate filter (DPF) upstream of the SCR. In embodiments of the invention, the aftertreatment components represented by reference numeral 108 may optionally include components wherein a DPF is positioned upstream of an SCR.

After a period of time of recycling through the recycling loop, a temperature level of the gas entering the aftertreatment system may be reached that is sufficient for efficient operation of components of the aftertreatment system. An aspect of the invention provides for a decrease in the amount of time required for components of the aftertreatment system to reach an efficient operational condition after a cold start.

Figure 7:
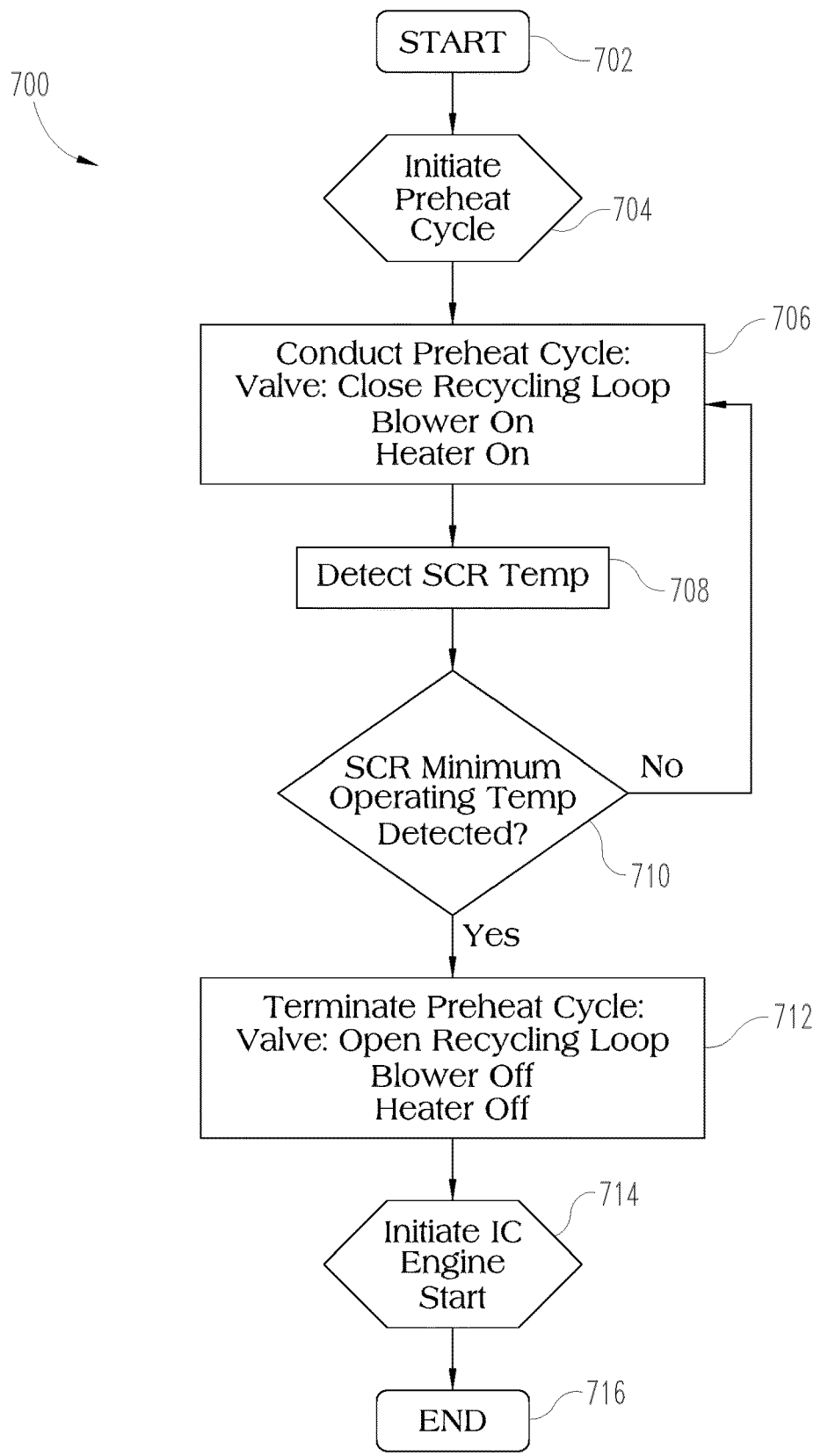
FIG. 7 is a flow diagram showing an exemplary process for reducing $NO_x$ emissions according to an embodiment of the invention.

FIG. 7 illustrates a flow diagram of an exemplary process 700 for operating an exemplary system according to an aspect of the invention. The process may include control of $NO_x$ emissions by employing a system of any of the illustrated configurations of FIGS. 2-6. The process or method may include a Start operation at step 702. The operation at step 702 may optionally include detection of a cold engine start condition. At step 704 an operation may be conducted to initiate a preheating cycle. The preheating cycle may be conducted in a closed recycling loop system as set forth in any one of FIGS. 2-6. At step 706 an operation may be conducted to conduct the preheating cycle by controlling one or more valves of the system to close the recycling loop so that gas may be recirculated within the loop. The step 706 may include activating the blower in the recycling loop system to drive circulation of gas within the closed loop system. The step 706 may include activating the heater of the closed loop system to increase the temperature of the recirculating gas in the closed loop system. The increased temperature of the recirculating gas may increase the temperature of one or more aftertreatment components disposed in, or in close proximity to, a portion of the closed loop recycling system.

After a time has elapsed wherein the preheating cycle has been conducted, an operation may be conducted at step 708 to detect, measure, estimate, or otherwise determine a temperature of the component of the aftertreatment system that is disposed in or in close proximity to the recycling loop system. The temperature may represent a minimum effective operating temperature of the component. The component may preferably be an SCR, and as an example, the minimum effective operating temperature may be a selected temperature at which the SCR may effectively conduct $deNO_x$ operations and/or SCR dosing may commence. The determinations may include a determination or prediction by the controller or components of the controller, such as, for example, determinations that utilize sensed data or information, algorithms, and/or look-up or reference tables, to determine or predict a temperature condition of the aftertreatment component, its inlet, components of the system near the aftertreatment component, or gas in the aftertreatment component.

At step 710, if it is determined that the temperature of the aftertreatment component reaches or exceeds a threshold temperature, then the YES or "Y" condition is satisfied, and the operation proceeds to step 712. If the temperature of the aftertreatment component does not meet or exceed the threshold temperature, then the NO or "N" condition is satisfied, and the process returns to operation 706 to continue conducting the preheating cycle, and determining the SCR temperature, in a repeating loop until the temperature of the aftertreatment component reaches or exceeds the threshold temperature and satisfies the "Y" condition.

Upon satisfaction of the "Y" condition, the method proceeds to the operation at step 712 to terminate the preheat cycle. The position of one or more valves may be adjusted to open the closed loop recycling system. The blower may be deactivated. The heater may be deactivated. The method then may proceed to an operation at step 714 to initiate a start of the internal combustion (IC) engine. At this point in the process, because the aftertreatment component has already been heated to reach at least a threshold temperature that may represent its minimum effective operating temperature, the component may be operated, and the operation may include a dosing operation such as dosing a reductant into an SCR system. In this manner, the $NO_x$ emissions of the internal combustion engine may be efficiently and effectively controlled. The method may conclude at the Stop operation at step 716.

Various aspects of the apparatuses, systems and methods disclosed herein are contemplated, including those in the claims appended hereto and in the discussion above. For example, an aspect is directed to an embodiment of an apparatus comprising an exhaust gas recycling system having a closed gas recycling loop configured to heat gas circulating within the loop, and a blower for circulating gas within the loop. In an embodiment, the system of the above comprises at least one valve disposed to selectively close off the recycling loop from at least a portion of an exhaust gas conduit of an engine. In an embodiment, the circulating gas heats at least one aftertreatment component of an exhaust gas aftertreatment system. In an embodiment, the system comprises at least one valve disposed to selectively close off the recycling loop from at least a portion of an exhaust gas conduit of an engine, and the circulating gas heats at least one aftertreatment component of an exhaust gas aftertreatment system.

In an embodiment of the apparatus of the invention, the circulating gas flows through at least one aftertreatment component of an exhaust gas aftertreatment system. In an embodiment, the system of the above comprises at least one valve disposed to selectively close off the recycling loop from at least a portion of an exhaust gas conduit of an engine, and the circulating gas flows through at least one aftertreatment component of an exhaust gas aftertreatment system. In an embodiment, the system of the above apparatus comprises at least one valve disposed to selectively close off the recycling loop from at least a portion of an exhaust gas conduit of an engine, the circulating gas heats at least one aftertreatment component of an exhaust gas aftertreatment system, and the circulating gas flows through at least one aftertreatment component of an exhaust gas aftertreatment system. In an embodiment, the circulating gas heats at least one aftertreatment component of an exhaust gas aftertreatment system, and the circulating gas flows through at least one aftertreatment component of an exhaust gas aftertreatment system.

In an embodiment of the apparatus of the invention, the recycling system comprises a heater. In an embodiment, the recycling system comprises a heater, and the system of the above comprises at least one valve disposed to selectively close off the recycling loop from at least a portion of an exhaust gas conduit of an engine. In an embodiment, the recycling system comprises a heater, the system of the above comprises at least one valve disposed to selectively close off the recycling loop from at least a portion of an exhaust gas conduit of an engine, and the circulating gas heats at least one aftertreatment component of an exhaust gas aftertreatment system. In an embodiment, the recycling system comprises a heater, the system of the above comprises at least one valve disposed to selectively close off the recycling loop from at least a portion of an exhaust gas conduit of an engine, and the circulating gas heats at least one aftertreatment component of an exhaust gas aftertreatment system, and the circulating gas flows through at least one aftertreatment component of an exhaust gas aftertreatment system.

In an embodiment of the apparatus of the invention, the recycling system comprises a heater, the circulating gas heats at least one aftertreatment component of an exhaust gas aftertreatment system, and the circulating gas flows through at least one aftertreatment component of an exhaust gas aftertreatment system. In an embodiment, the recycling system comprises a heater, the system of the above comprises at least one valve disposed to selectively close off the recycling loop from at least a portion of an exhaust gas conduit of an engine, and the circulating gas flows through at least one aftertreatment component of an exhaust gas aftertreatment system. In an embodiment, the recycling system comprises a heater, and the circulating gas flows through at least one aftertreatment component of an exhaust gas aftertreatment system.

In an embodiment of the apparatus of the invention, the recycling system comprises a heater disposed on an exhaust gas conduit of an engine. In an embodiment, the recycling system comprises a heater disposed on an exhaust gas conduit of an engine, and the system of the above comprises at least one valve disposed to selectively close off the recycling loop from at least a portion of an exhaust gas conduit of an engine. In an embodiment, the recycling system comprises a heater disposed on an exhaust gas conduit of an engine, the system of the above comprises at least one valve disposed to selectively close off the recycling loop from at least a portion of an exhaust gas conduit of an engine, and the circulating gas heats at least one aftertreatment component of an exhaust gas aftertreatment system.

In an embodiment of the apparatus of the invention, the recycling system comprises a heater disposed on an exhaust gas conduit of an engine, the system of the above comprises at least one valve disposed to selectively close off the recycling loop from at least a portion of an exhaust gas conduit of an engine, the circulating gas flows through and heats at least one aftertreatment component of an exhaust gas aftertreatment system. In an embodiment, the recycling system comprises a heater disposed on an exhaust gas conduit of an engine, and the circulating gas flows through and heats at least one aftertreatment component of an exhaust gas aftertreatment system. In an embodiment, the recycling system comprises a heater disposed on an exhaust gas conduit of an engine, the system of the above comprises at least one valve disposed to selectively close off the recycling loop from at least a portion of an exhaust gas conduit of an engine, and the circulating gas flows through at least one aftertreatment component of an exhaust gas aftertreatment system. In an embodiment, the recycling system comprises a heater disposed on an exhaust gas conduit of an engine, and the circulating gas heats at least one aftertreatment component of an exhaust gas aftertreatment system.

In an embodiment of the apparatus of the invention, the recycling system comprises a heater disposed on a loop conduit portion of the recycling loop separate from an exhaust gas conduit of an engine. In an embodiment, the recycling system comprises a heater disposed on a loop conduit portion of the recycling loop separate from an exhaust gas conduit of an engine, and the system of the above comprises at least one valve disposed to selectively close off the recycling loop from at least a portion of an exhaust gas conduit of an engine.

In an embodiment of the apparatus of the invention, the recycling system comprises a heater disposed on a loop conduit portion of the recycling loop separate from an exhaust gas conduit of an engine, the system of the above comprises at least one valve disposed to selectively close off the recycling loop from at least a portion of an exhaust gas conduit of an engine, and the circulating gas heats at least one aftertreatment component of an exhaust gas aftertreatment system. In an embodiment, the recycling system comprises a heater disposed on a loop conduit portion of the recycling loop separate from an exhaust gas conduit of an engine, the system of the above comprises at least one valve disposed to selectively close off the recycling loop from at least a portion of an exhaust gas conduit of an engine, and the circulating gas flows through and heats at least one aftertreatment component of an exhaust gas aftertreatment system. In an embodiment, the recycling system comprises a heater disposed on a loop conduit portion of the recycling loop separate from an exhaust gas conduit of an engine the circulating gas, and the circulating gas flows through and heats at least one aftertreatment component of an exhaust gas aftertreatment system. In an embodiment, the recycling system comprises a heater disposed on a loop conduit portion of the recycling loop separate from an exhaust gas conduit of an engine, the system of the above comprises at least one valve disposed to selectively close off the recycling loop from at least a portion of an exhaust gas conduit of an engine, and 4 the circulating gas flows through at least one aftertreatment component of an exhaust gas aftertreatment system. In an embodiment, the recycling system comprises a heater disposed on a loop conduit portion of the recycling loop separate from an exhaust gas conduit of an engine, and the circulating gas heats at least one aftertreatment component of an exhaust gas aftertreatment system.

In any of the embodiments above, the aftertreatment component preferably may be a catalyst of a selective catalytic reduction system. In any of the embodiments above, the aftertreatment component may be disposed on the loop, while other components of the aftertreatment system are disposed downstream of the loop.

In an embodiment of the invention, an exhaust gas recycling system comprises a gas recycling loop configured to heat gas circulating within the loop, the loop comprising a recycling loop conduit and a portion of an exhaust gas conduit of an engine; a blower configured to circulate gas within the loop, disposed on a blower portion of the recycling loop conduit; a first set of valves disposed to selectively close off the recycling loop from at least a portion of the exhaust gas conduit of an engine, and a second set of valves disposed to selectively isolate the blower portion of the recycling loop conduit from the rest of the loop. In an embodiment, the circulating gas heats at least one aftertreatment component of an exhaust gas aftertreatment system. Any of the various embodiments of the apparatus as described in the preceding paragraphs above may be comprised in a recycling system of the present embodiment.

In an aspect of the invention, there is provided a method for operating an internal combustion engine, comprising preheating at least one aftertreatment component of an exhaust gas aftertreatment system of the engine by exposing the component to heated gas circulating in a closed gas recycling loop. In an embodiment, the method may further include detecting a temperature of the component, and terminating the preheating in response to the temperature meeting a temperature threshold. In an embodiment, the method may further include initiating start of the engine after the preheating. Any of the various embodiments of the apparatuses and systems described in the preceding paragraphs above may be employed in a method of the present embodiment.

The operations illustrated for the processes in the present application are understood to be examples only, and operations may be combined or divided, and added or removed, as well as re-ordered in whole or in part, unless explicitly stated to the contrary. It is understood that the operations for the processes in the present application may be conducted or controlled by one or more components of the controller or its associated components, systems, actuators, and/or sensors, as described above in more detail in the discussion of FIG. 1.

One of skill in the art may appreciate from the foregoing that unexpected benefits are derived from application of the method, system, and apparatus to the problem of improving fuel efficiency in operating a conventional vehicle, without the need for additional components or parts, or changes in the configuration of a conventional vehicle or its features. Additional components and parts may add weight to a vehicle and thereby reduce fuel efficiency. Changes to configuration of a conventional vehicle may add costs and complexity to manufacture, operation, and maintenance of the vehicle. A key benefit contemplated by the inventors is improvement of fuel efficiency in a conventional vehicle through use of the disclosed system, method, and/or apparatus, while excluding any additional components, steps, or change in structural features. In this exclusion, maximum cost containment may be effected. Accordingly, the substantial benefits of simplicity of manufacture, operation, and maintenance of standard or conventionally produced vehicles as to which the system, method, and/or apparatus may be applied may reside in an embodiment of the invention consisting of, consisting solely of, or consisting essentially of, the elements of the method, system, and/or apparatus disclosed herein. Thus, embodiments of the invention explicitly contemplate the exclusion of steps, features, parts, and components beyond those set forth herein, and explicitly contemplate, in some embodiments, the exclusion of certain steps, features, parts, and components that are set forth in this disclosure.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary. The words "a" and "one" are defined as including one or more of the referenced item unless specifically noted. The phrase "at least one of" followed by a list of two or more items, such as "A, B or C," means any individual one of A, B or C, as well as any combination thereof. Words such as "upper," "lower," "top," "bottom," "first," and "second" designate directions in the drawings to which reference is made. This terminology includes the words specifically noted above, derivatives thereof, and words of similar import.

The invention claimed is:

1. An apparatus comprising:
an exhaust gas recycling system having a closed gas recycling loop including at least one exhaust gas aftertreatment component in the closed gas recycling loop, wherein the exhaust gas recycling system is configured to heat gas circulating within the closed gas recycling loop, and the exhaust gas recycling system includes a blower for circulating heated gas within the closed gas recycling loop.

2. The apparatus of claim 1, wherein the exhaust gas recycling system comprises at least one valve disposed to selectively close off a portion of an exhaust gas conduit of an engine that is downstream of the closed gas recycling loop.

3. The apparatus of claim 1, wherein the circulating gas flows through the at least one exhaust gas aftertreatment component of the exhaust gas aftertreatment system.

4. The apparatus of claim 1, wherein the exhaust recycling system comprises an electric heater in the closed gas recycling loop.

5. The apparatus of claim 4, wherein the electric heater is disposed on an exhaust gas conduit of an engine.

6. The apparatus of claim 4, wherein the electric heater is disposed on a loop conduit portion of the closed gas recycling loop separate from an exhaust gas conduit of an engine.

7. The apparatus of claim 1, wherein the at least one exhaust gas aftertreatment component is a catalyst of a selective catalytic reduction system.

8. The apparatus of claim 3, wherein the at least one exhaust gas aftertreatment component is disposed on the closed gas recycling loop, and other aftertreatment components are disposed downstream of the closed gas recycling loop.

9. An exhaust gas recycling system, comprising:
a gas recycling loop configured to heat gas circulating within the gas recycling loop, the gas recycling loop comprising a recycling loop conduit, a portion of an exhaust gas conduit of an engine, and at least one exhaust gas aftertreatment component in the portion of the exhaust gas conduit;
a blower configured to circulate gas within the gas recycling loop, the blower disposed on a blower portion of the recycling loop conduit;
a first set of valves disposed to selectively close off the recycling loop conduit from the portion of the exhaust gas conduit; and
a second set of valves disposed to selectively isolate the blower portion of the recycling loop conduit from the rest of the recycling loop conduit and from the exhaust gas conduit.

10. The system of claim 9, wherein the circulating gas heats the at least one exhaust gas aftertreatment component that is located in the gas recycling loop.

11. A method for operating an internal combustion engine, comprising:
closing a downstream valve and closing an upstream valve of an exhaust gas system to form a closed gas recycling loop, wherein the downstream valve is located in an exhaust gas conduit of the exhaust gas system downstream of at least one aftertreatment component the upstream valve is located in the exhaust gas conduit between the at least one aftertreatment component and the internal combustion engine; and
preheating the at least one aftertreatment component of the exhaust gas system of the internal combustion engine prior to starting the internal combustion engine by exposing the at least one aftertreatment component to heated gas circulating in the closed gas recycling loop, wherein the at least one aftertreatment component is located in the closed gas recycling loop.

12. The method according to claim 11, comprising:
detecting a temperature of the at least one aftertreatment component; and
terminating the preheating in response to the temperature meeting a temperature threshold.

13. The method according to claim 12, comprising:
initiating start of the engine after terminating the preheating.

14. The method according to claim 11, wherein the heated gas is repeatedly circulated in the closed gas recycling loop while preheating the at least one aftertreatment component.

15. The method according to claim 11, further comprising:
heating the gas with a heater that is located in the closed gas recycling loop prior to starting the internal combustion engine; and
circulating the heated gas with a blower located in closed gas recycling loop.

16. A method for operating an internal combustion engine, comprising:
preheating at least one aftertreatment component of an exhaust gas system of the internal combustion engine prior to starting the internal combustion engine by exposing the at least one aftertreatment component to heated gas circulating in a closed gas recycling loop, wherein the at least one aftertreatment component is located in the closed gas recycling loop, and wherein preheating at least one aftertreatment component includes activating an electric heater in the closed gas recycling loop.

17. The system of claim 9, wherein the gas recycling loop includes a heater located in a heater portion of the recycling loop conduit.

18. The system of claim 17, wherein the recycling loop conduit includes:
an upstream valve connecting the heater portion of the recycling loop conduit to the portion of the exhaust gas conduit of the gas recycling loop upstream of the at least one aftertreatment component;
a downstream valve connecting the blower portion of the recycling loop conduit to the portion of the exhaust gas conduit of the gas recycling loop downstream of the at least one aftertreatment component; and
a bypass conduit connected to the heater portion and the blower portion of the recycling loop conduit with a bypass valve, the bypass conduit further being connected to the portion of the exhaust gas conduit of the gas recycling loop upstream of the at least one aftertreatment component.

* * * * *